(12) United States Patent
Stahl et al.

(10) Patent No.: US 8,169,620 B1
(45) Date of Patent: May 1, 2012

(54) SUB-PIXEL SPATIAL RESOLUTION WAVEFRONT PHASE IMAGING

(75) Inventors: H. Philip Stahl, Brownsboro, AL (US); James T. Mooney, Fairport, NY (US)

(73) Assignee: The United States of America, as represented by the Administrator of the National Aeronautics and Space Administration, Washington, DC (US)

( * ) Notice: Subject to any disclaimer, the term of this patent is extended or adjusted under 35 U.S.C. 154(b) by 389 days.

(21) Appl. No.: 12/563,819

(22) Filed: Sep. 21, 2009

(51) Int. Cl.
*G01B 9/02* (2006.01)

(52) U.S. Cl. ........................................ 356/513; 356/515

(58) Field of Classification Search .................. 356/489, 356/495, 494, 488, 511–516, 521
See application file for complete search history.

(56) References Cited

U.S. PATENT DOCUMENTS

| | | | |
|---|---|---|---|
| 4,791,584 A | 12/1988 | Greivenkamp, Jr. | |
| 4,868,654 A | 9/1989 | Juri et al. | |
| 5,220,583 A | 6/1993 | Solomon | |
| 6,028,670 A | 2/2000 | Deck | |
| 6,449,048 B1 * | 9/2002 | Olszak | 356/497 |
| 6,686,996 B2 | 2/2004 | Sullivan et al. | |
| 6,771,375 B2 | 8/2004 | Zanoni | |
| 6,904,164 B2 | 6/2005 | Norioka et al. | |
| 6,956,655 B2 | 10/2005 | Hill | |
| 6,956,657 B2 | 10/2005 | Golini et al. | |
| 6,987,570 B1 | 1/2006 | Schmit et al. | |
| 7,173,715 B2 | 2/2007 | Mueller et al. | |
| 7,218,403 B2 | 5/2007 | Kuchel | |
| 7,221,461 B2 | 5/2007 | Evans | |
| 7,545,511 B1 * | 6/2009 | Gutin | 356/512 |

OTHER PUBLICATIONS de Groot et al.; "Three-dimensional imaging by sub-Nyquist sampling of white-light interfergrams"; Optics Letters vol. 18, No. 17; pp. 1462-1464, Sep. 1, 1993.*
Mooney, James T. and Stahl, H. Philip, Sub-pixel Spatial Resolution Micro-roughness Measurements with Interlaced Stitching, SPIE, Aug. 2, 2005, 5878-1.
Mooney, James T. and Stahl, H. Philip, Sub-pixel Spatial Resolution Interferometry with Interlaced Stitching, SPIE, Aug. 18, 2005, 5869-39.

* cited by examiner

*Primary Examiner* — Hwa Lee
(74) *Attorney, Agent, or Firm* — Peter J. Van Bergen; James J. McGroary

(57) ABSTRACT

A phase imaging method for an optical wavefront acquires a plurality of phase images of the optical wavefront using a phase imager. Each phase image is unique and is shifted with respect to another of the phase images by a known/controlled amount that is less than the size of the phase imager's pixels. The phase images are then combined to generate a single high-spatial resolution phase image of the optical wavefront.

27 Claims, 1 Drawing Sheet

SUB-PIXEL SPATIAL RESOLUTION WAVEFRONT PHASE IMAGING

Figure 1:
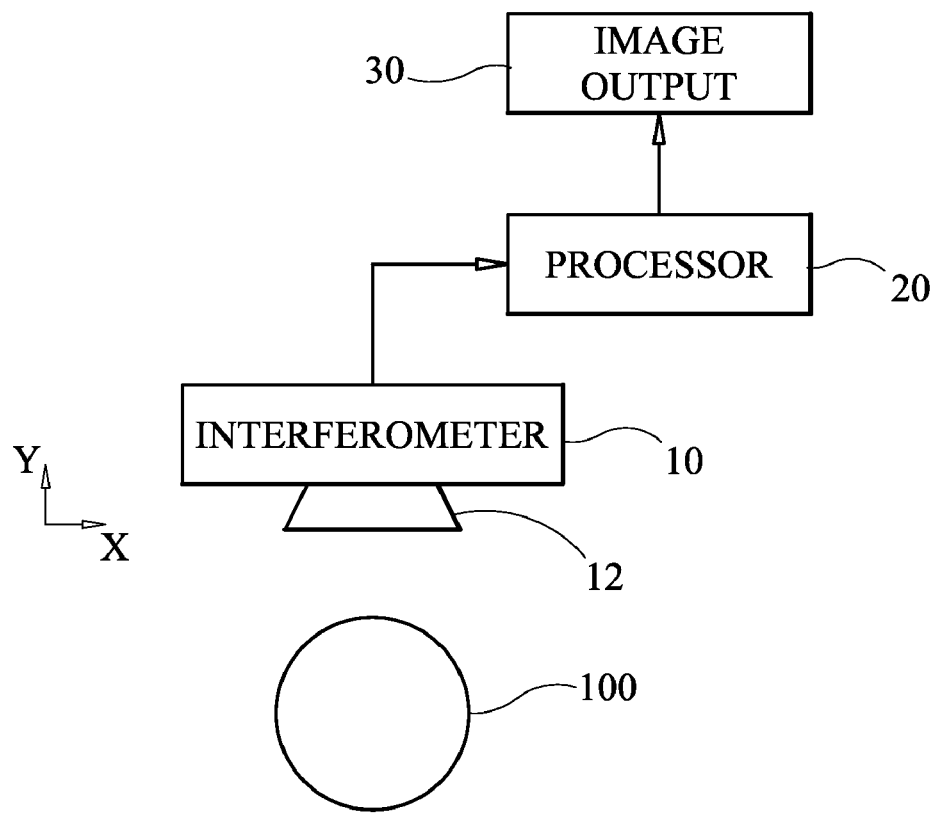

The invention described herein was made in the performance of work under a NASA contract and by an employee of the United States Government and is subject to the provisions of Public Law 96-517 (35 U.S.C. §202) and may be manufactured and used by or for the Government for governmental purposes without the payment of any royalties thereon or therefore. In accordance with 35 U.S.C. §202, the contractor elected not to retain title.

BACKGROUND OF THE INVENTION

1. Field of the Invention

This invention relates to wavefront phase imaging methods to include interferometric phase imaging. More specifically, the invention is a method that collects multiple wavefront phase images with known sub-pixel shifts being implemented between each image, and combines these images into a single image of the measured wavefront.

2. Description of the Related Art

It is well known that all optical systems and their components produce optical wavefronts. Examples of components include reflecting surfaces, refracting surfaces, transmitting surfaces, diffracting surfaces, light emitting surfaces, etc. Examples of systems using these components include telescopes, camera and lithography lenses, lasers, etc. The measurement of optical wavefronts is extremely useful and provides valuable information about the physical properties or performance of individual optical components or the assembled system. The measurement of optical wavefronts is well known and includes the following techniques/systems:
  interferometry,
  phase-measuring interferometers or interference microscopes employing any number of different methods such as phase-stepping, phase-shifting, instantaneous, carrier fringe, etc.,
  use of other wavefront sensors employing any number of different methods such as phase-diversity, phase-retrieval, lens-let arrays, screen tests, Ronchi tests, etc.
All of these wavefront measurement methods provide data over a limited spatial frequency band.

Generating high-resolution images of an optical system's wavefront phase is useful for a variety of applications. For example, technical specifications for high-precision optical components include distinct spatial frequency bands over the full aperture of an optical component. Interferometers are used to perform measurements of an optical component in order to provide information on these specifications. The spatial frequency of the surface features that an interferometer can resolve is defined by the Nyquist frequency of the imaging systems or 1/(2*pixel size). That is, an interferometer cannot resolve spatial frequencies that are greater than this limit. Thus and as is well known in the art, an interferometer's optical resolution is limited by the pixel size and spacing of the interferometer's "change coupled device" (CCD) detector/imager. For example, if an optical component has a full aperture of 100 millimeters, an interferometer having a 1024×1024 CCD detector (i.e., a square array of 1024 pixels by 1024 pixels) can resolve features that are 0.2 millimeters or larger. However if the same CCD detector is used to generate an interferogram of an optical component having a full aperture of 4 meters, this same interferometer cannot resolve any features that are smaller than 8 millimeters. Since the performance of a 4 meter high-precision optical component can easily be compromised by a feature that is less than 8 millimeters, it is necessary to make higher resolution interferograms. Note that the same discussion also applies to smaller optical components. For example, the Nyquist limit affects the ability of interference microscopes to measure high-spatial frequency features such as surface roughness, physical phenomena, natural structure, engineered micro or nano-scale structure, etc.

Current approaches to solving the Nyquist problem include the use of higher resolution CCD detectors and sub-aperture imaging where the CCD detector takes multiple sub-aperture sized images of an optical component and then "stitches" the sub-aperture images together. However, higher resolution CCD detectors greatly increase the cost of interferometric measurement systems. The sub-aperture imaging approach requires fairly large movements of the optical component that must be precise in order to enable the interferometer to "stitch" the multiple images together accurately. The motion and time between sub-aperture measurements can cause measurement "noise" that decreases the accuracy of the measurement data. Further, stitching requires the overlap of data sets. To minimize the propagation of low spatial frequency noise in the stitching result, typical processing techniques use a data overlap of 50% that, in turn, drives the number of measurements needed to reconstruct the wavefront phase.

SUMMARY OF THE INVENTION

Accordingly, it is an object of the present invention to provide a method of making high-spatial resolution phase measurements of an optical wavefront.

Another object of the present invention is to provide a method of making high-spatial resolution interferometric phase measurements of an optical wavefront.

Another object of the present invention is to provide a method of making high-spatial resolution interferometric measurements of the optical wavefront produced by the aperture of optical components.

Other objects and advantages of the present invention will become more obvious hereinafter in the specification and drawings.

In accordance with the present invention, a wavefront phase imaging method uses a wavefront phase imager. A plurality of phase images of the optical wavefront are acquired using the phase imager. Each phase image is unique and is shifted with respect to another of the phase images by a known amount that is less than the phase imager's pixels' size dimension. The plurality of phase images are then combined to generate a single phase image of the optical wavefront.

BRIEF DESCRIPTION OF THE DRAWING(S)

Figure 2:
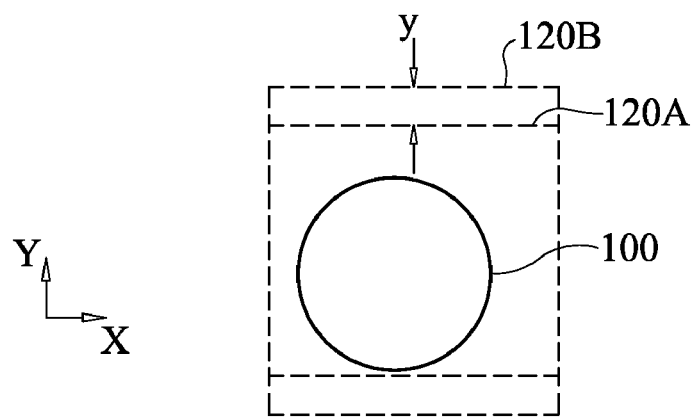

Other objects, features and advantages of the present invention will become apparent upon reference to the following description of the preferred embodiments and to the drawings, wherein corresponding reference characters indicate corresponding parts throughout the several views of the drawings and wherein:

FIG. 1 is a schematic view of an optical wavefront phase imaging set-up for use in accordance with the method of the present invention; and FIG. 2 is a plan view of an optical wavefront of arbitrary shape illustrating two phase image captures thereof with sub-pixel shifts there between in accordance with the present invention.

DESCRIPTION OF THE PREFERRED EMBODIMENT(S)

Referring now to the drawings and more particularly to FIG. 1, an optical wavefront phase imaging set-up for use in accordance with the present invention is illustrated. It is to be understood that the present invention can be used to generate a high-resolution phase image of any optical wavefront produced by some type of optical "component" (e.g., reflecting surface, transmitting surface, diffracting surface, refracting material, emitting surface, etc.) or "system" (e.g., telescope, camera, lens, laser, etc.). It is to be further understood that the present invention can be applied using any wavefront phase measuring sensor/sensing system or methodology (e.g., interferometry, phase-measuring interferometer or interference microscope employing any number of different methods such as phase-stepping, phase-shifting, instantaneous, carrier fringe, etc., interference microscopes and other wavefront sensors employing any number of different methods such as phase-diversity, phase-retrieval, lens-let arrays, screen tests, Ronchi tests, etc.). By way of example, the present invention will be described for use in generating a high-resolution interferometric image of an optical wavefront produced by light reflecting or passing through a high-precision optical component as the means for characterizing the precision of the component's surface.

In FIG. 1, the optical wavefront to be imaged is referenced by numeral 100 with an arbitrary boundary thereof being indicative of the optical wavefront's aperture. Located a distance from optical wavefront 100 is a wavefront sensor such as an interferometer 10 that includes an image detector 12 (e.g., a CCD detector defined by a two-dimensional array of pixels) as part thereof. Such interferometers are well known in the art and the particular choice thereof is not a limitation of the present invention Further, note that interferometer 10 can be replaced by any number of wavefront sensors/imagers capable of acquiring phase images of optical wavefront 100. As will be explained further below, interferometer 10 is used to capture a number of unique low-resolution interferometric images of the entire aperture of optical wavefront 100. These low-resolution images are then combined to produce a single high-resolution interferometric image of the aperture of optical wavefront 100. Accordingly, a processor 20 is provided to perform image processing in accordance with the present invention, and an image output device 30 is provided to display, print, archive, communicate, etc., the high-resolution image. Interferometer 10, processor 20 and image output 30 can be separate devices or an integrated device/system without departing from the scope of the present invention.

The above-noted unique low-resolution interferometric images of optical wavefront 100 require the repositioning or shifting of one or both image detector 12 and the optical component producing wavefront 100 so that each captured image of the aperture of optical wavefront 100 is unique. The mechanism(s) for generating such shifts is not a limitation of the present invention. As the size and/or weight of optical component 100 increases, the required shifts may be more readily implemented by shifting only image detector 12. Typically, interferometer 10 images the wavefront under test from some plane in space onto image detector 12. In this way, the physical plane of image detector 12 is said to be conjugate to a plane through the wavefront under test. For the purposes of FIG. 2, it is assumed that this is the X-Y plane. Therefore, the shift between images occurs in an X-Y plane. In general, the amount of shift is less than a size dimension (e.g., diameter, width, etc.) of the image detector's pixel. while the shift could be larger, there is no unique advantage of a larger shift.

The only requirement of the shift in the present invention is that the amount of the shift must be known. However, it is easier to implement the method if the shift is known and controlled such that the shifts are uniform. The amount of this shift is calculated by dividing the pixel size dimension (e.g., diameter, width, etc.) by the number of unique independent phase measurements to be acquired. For example, if two unique independent measurements are to be acquired per pixel dimension, then the shift should be one half pixel. If four measurements are to be acquired, then the shift should be one-quarter pixel. This calculation can be extended arbitrarily depending upon the desired high-spatial frequency sampling.

By way of illustration, FIG. 2 depicts the field-of-view of image detector 12 as a dashed-line box overlaid on the full aperture of optical wavefront 100. More specifically, a first image is captured with the field-of-view of image detector 12 positioned as illustrated by box 120A. A relative shift in the Y-dimension (i.e., by shifting one or both of image detector 12 and the optical component producing optical wavefront 100) by a known and controlled amount "y" is then implemented before a second image is captured with the field-of-view of image detector 12 now positioned as illustrated by box 120B. The sub-pixel shift amount "y" must be equal to the desired high-spatial frequency sampling. The above-described capture-and-shift procedure is repeated a number of times to thereby generate a plurality of unique interferometric phase images of the aperture of optical wavefront 100. Note that this plurality of images can be processed (as described below) to produce a phase imaged with high-spatial frequency data only in the Y-direction. To obtain high-spatial frequency data in the X-direction requires a plurality of images with known "x" shifts in the X-direction. A full high-spatial frequency phase map requires two sets of data with orthogonal shifts or a single set of data acquired by a series of shifts represented by the vector combination of the orthogonal shifts. For example, if the CCD detector has pixels of dimension (x,y) and the desired high spatial frequency sampling per pixel was 10, then the orthogonal shifts for the independent data sets would be (0.1x,0) and (0,0.1y). The vector shift magnitude would be the square root of the sum of the squares of the orthogonal shifts.

Since the entire aperture of optical wavefront 100 is acquired in each image, the resolution of each image is necessarily of lower resolution as compared to the well known sub-aperture imaging technique where an image detector can be focused on just a portion the aperture of an optical wavefront. However, the present invention combines the plurality of low-resolution images to form a single higher-resolution interferometeric image.

In general, combining the plurality of unique/shifted images in the present invention involves what is known in the art of image processing as a "stitching" process. In the present invention, each captured image includes the entire aperture of optical wavefront 100. Thus, there will be a substantial amount of overlap between captured images to generate a single high-resolution image. A variety of stitching approaches can be used without departing from the scope of the present invention. For example, a simple spatial domain stitching approach is referred to herein as "interlaced stitching". In this approach, the pixels from overlapping portions of the raw low-resolution images are combined together in the spatial domain with no other processing to form a data vector or data matrix which represents the high-spatial frequency wavefront phase image. This approach ignores system noise such as vibration, thermal drift, thermal effects, settling, etc., affecting the length of the optical path (in the Z-dimension) between the image detector and the optical component producing optical wavefront 100.

A simplified mathematical explanation of interlaced stitching (which can be extended to two dimensions) is as follows:

Assume a surface whose height distribution "z" as a function of position is unknown such that $$z=s(x,y)=s(x)$$

Also assume that a "phase-measuring interferometer" (PMI) sensor is used to measure this surface height wavefront phase at a specific point, X0. The output of the PMI at position X0 is described mathematically as $$m(X0)=s(X0)$$

After an image is captured, the PMI's sensor is moved along the surface by an amount $\Delta x$ and the surface at a new location m(1) is measured $$m(X1)=s(X0+\Delta x)$$

Repeating this process many times and combining the measurements creates a data vector described by the summation:

$$m(X_k) = \sum_{k=0}^{n} s(x_0 + k\Delta x)$$

Now, assume that the PMI sensor is a linear array of ideal pixels and that the total shift $k\Delta x$ is equal to the separation of adjacent pixels. The resultant data vector is an interlaced stitching of k unique independent phase images.

The above-described approach does not account for the effect of real pixels or system noise such as vibration, thermal drift, thermal effects, settling, etc.

To account for these sources of noise, the present invention can include noise filtering of the low-resolution images prior to the stitching thereof. By way of example, two filtering approaches will be described. The noise or drift associated with phase measurements primarily consists of low spatial frequency drift. In recognition of this, one approach for reducing the effects of this noise is to perform a frequency-based spatial filtering of the raw low-resolution images prior to the stitching process. This essentially involves separating the high spatial frequency data from the low spatial frequency data for each of the low-resolution images. As would be understood by one of ordinary skill in the art, such separation is performed by processing the raw low-resolution image data using high and low pass spatial filters. The noise associated with the phase images remains with the low spatial frequency components of the data thereby leaving the high spatial frequency components of the data substantially noise free. The resulting high spatial frequency data sets are combined via interlaced stitching. The low spatial frequency data sets are averaged. The averaged low spatial frequency data is then combined with the stitched high spatial frequency data.

Another filtering approach that can be used prior to stitching of the data sets involves a Zernike or other polynomial fit technique. As would be understood by one of ordinary skill in the art, this filtering process fits Zernike polynomials to the raw low-resolution image data prior to stitching of the data. As with the previously-described filtering process, the goal is to separate the low spatial frequency data from the high spatial frequency data, and then utilize the interlaced stitching process on the high spatial frequency data. Briefly, Zernike polynomials are fit to the raw low-resolution image data sets and the Zernike coefficients obtained from each data set are averaged with the corresponding Zernike coefficients from the other data sets. The residual surface error, after Zernike removal, are interlace stitched together. The averaged Zernike coefficients are then added to the stitched data.

Using any of the above-described raw stitching or filtering-then-stitching approaches produces a high-resolution interferometric mapping of data that can be readily produced as an image, e.g., on image output 30. However, the high-resolution mapping is blurred due to a convolved pixel at the overlapped/stitched regions. To remove such blurring, a deconvolution process can be applied. A variety of deconvolution image processing techniques are known in the art. See, for example, J. L. Starck, E. Pantin. F. Murtagh, "Deconvolution in Astronomy: A Review," Pub. Astron. Soc. Pac., 114, pp. 1051-1069, 2002; F. Aghdasi, R. K. Ward, "Reduction of Boundary Artifacts in Image Restoration," IEEE Trans. On Image Processing, Vol. 5, No. 4, April 1996, pp 611-618; and T. F. Gee, T. P. Karnowski, K. W. Tobin, "Multifame Combination and Blur Deconvolutuion of Video," Proceedings of IS&T/SPIE's 12$^{th}$ International Symposium on Electronic Imaging: Science and Technology, January 2000.

The stitching of the raw low-resolution phase image data is performed via interlaced stitching in the spatial domain and then taken into the frequency domain to remove pixel blurring. Such frequency domain filtering is directly analogous to well-known deconvolution image processing techniques. The combination of interlaced stitching and deconvolution for finite dimension pixels can be described mathematically. While the following discussion will be constrained to one-dimension for simplicity, the method is completely general and extendable to two dimensions.

Assume an unknown surface whose height distribution as a function of position is unknown such that $$z=s(x,y)=s(x)$$

Also assume that a "phase-measuring interferometer" (PMI) is used to measure average surface height over the physical dimensions of a square pixel with size (x,y) where $$rect(x,y)=rect(x)$$

The output of the PMI at position X0 is described mathematically as $$m(X0)=rect(x)s(x)$$

That is, the detector responsivity at any given physical location (x) is multiplied by the surface shape at the same physical position (x) to yield a measurement value. This value is then integrated over the physical extent of the pixel to yield an average measurement value. A more precise mathematical description of this is $$m(x_0) = \int_{-a}^{+a} rect(x)s(x)\,dx$$

where the physical size of the pixel extends from −a to +a.

After a phase image is captured, the PMI's pixel is moved along the surface by a "sub-pixel" amount $\Delta x$ and the surface at a new location m(X1) is measured $$m(X1)=rect(x)s(x+\Delta x)$$

Repeating this process many times creates a vector of measurements described by the summation $$m(k) = \sum_{k=0}^{n} rect(x)s(x+k\Delta x)$$

that can be described as a convolution $$m(x)=rect(x)*s(x)$$

From the measurement vector, the actual surface height is solved for by performing a deconvolution to remove the pixel signature. This is accomplished by taking the measurement vector into Fourier space and dividing it by the Fourier transform of the PMI pixel. Note that this division operation can only be done in Fourier space.

$$F\{m(x)\}=F\{rect(x)*s(x)\}$$

$$M(\xi)=\text{Sin } c(\xi)S(\xi)$$

$$S(\xi)=M(\xi)\text{Sin } c(\xi)$$

$$s(x)=F^{-1}\{S(\xi)\}=F^{-1}\{M(\xi)\text{Sin } c(\xi)\}$$

The result is a vector describing the surface height at a spatial resolution equal to that of the sub-pixel $\Delta x$ step size between measurements. This spatial resolution is obtained even if the pixel size itself is many times larger than the step size.

The advantages of the present invention are numerous. Low-resolution wavefront phase measurements with known/controlled sub-pixel shifts there between can be combined to yield a high-resolution phase image of an optical wavefront. The invention will allow a relatively inexpensive low-resolution interferometer (or generic wavefront sensor) to be used to generate data for any optical wavefront. For example, when used to generate high-resolution interferometric images for large precision optics, the data will have a spatial resolution that is higher than that defined by the interferometer's fundamental Nyquist limit. The approach described herein will allow precision optics to be accurately evaluated by the end user against design specifications. Fabricators of precision optics could use the present invention to deterministically correct higher spatial frequency errors. Fabricators of nanostructures could use the present invention to characterize sub-pixel resolution structural features.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A wavefront phase imaging method, comprising the steps of:
providing an optical wavefront;
providing a wavefront phase imager for generating images using an array of pixels with each of said pixels defined by a size dimension;
acquiring a plurality of phase images in a plane of the optical wavefront using the phase imager wherein each of said phase images is unique and shifted in said plane with respect to another of said phase images by a known amount that is less than the pixels' size dimension; and
combining said plurality of phase images to generate a single high-spatial frequency phase image of the optical wavefront.

2. A method according to claim 1, wherein said step of acquiring includes the step of moving at least one of an optical system generating the optical wavefront and the phase imager after each of said phase images is acquired wherein a subsequent one of said phase images is so-shifted with respect to a previous one of said phase images.

3. A method according to claim 1, wherein said step of acquiring includes the step of moving an optical system generating the optical wavefront relative to the phase imager after each of said phase images is acquired wherein a subsequent one of said phase images is so-shifted with respect to a previous one of said phase images.

4. A method according to claim 1, wherein said step of acquiring includes the step of moving the phase imager relative to an optical system generating the optical wavefront after each of said phase images is acquired wherein a subsequent one of said phase images is so-shifted with respect to a previous one of said phase images.

5. A method according to claim 1, wherein said step of combining includes the step of stitching overlapping portions of said plurality of phase images.

6. A method according to claim 5, wherein said step of stitching is performed in the spatial domain.

7. A method according to claim 1, further comprising the step of spatially filtering each of said plurality of phase images prior to said step of combining.

8. A method according to claim 7, wherein said step of spatially filtering is performed using a low-pass/high-pass filtering technique.

9. A method according to claim 7, wherein said step of spatially filtering is performed using a polynomial fit filtering technique.

10. A method according to claim 1, wherein said known amount is uniform throughout said step of acquiring.

11. A method according to claim 1, wherein said known amount is in one of two orthogonal directions.

12. A method according to claim 1, wherein said known amount is along a vector that is a combination of two orthogonal directions.

13. A method according to claim 7, wherein said step of combining includes the step of stitching overlapping portions of said plurality of phase images so-spatially filtered.

14. A method according to claim 13, wherein said step of stitching is performed in the spatial domain.

15. A method according to claim 14, further comprising the step of deconvolving each of said overlapping portions using the pixels' size dimension and the phase imager's point spreading function.

16. A wavefront phase imaging method, comprising the steps of:
providing an optical system capable of producing an optical wavefront;
providing a wavefront phase imager for generating images using an array of pixels with each of said pixels defined by a size dimension;
acquiring a plurality of phase images in a plane of the optical wavefront using the phase imager, wherein at least one of the optical system and the phase imager is moved by a controlled amount after each of said phase images is acquired such that each of said phase images is unique and shifted in said plane with respect to another of said phase images, and wherein said controlled amount is less than the pixels' size dimension;

spatially filtering each of said plurality of phase images to form a corresponding plurality of filtered phase images; and combining said plurality of filtered phase images to generate a single phase image of the optical wavefront.

17. A method according to claim 16, wherein said step of acquiring includes the step of moving only the optical system after each of said phase images is acquired.

18. A method according to claim 16, wherein said step of acquiring includes the step of moving only the phase imager after each of said phase images is acquired.

19. A method according to claim 16, wherein said step of combining includes the step of stitching overlapping portions of said plurality of filtered phase images.

20. A method according to claim 19, wherein said step of stitching is performed in the spatial domain.

21. A method according to claim 16, wherein said step of spatially filtering is performed using a low-pass/high-pass filtering technique.

22. A method according to claim 16, wherein said step of spatially filtering is performed using a polynomial fit filtering technique.

23. A method according to claim 16, wherein said controlled amount is uniform throughout said step of acquiring.

24. A method according to claim 16, wherein said controlled amount is in one of two orthogonal directions.

25. A method according to claim 16, wherein said controlled amount is along a vector that is a combination of two orthogonal directions.

26. A wavefront phase imaging method, comprising the steps of:

providing an optical wavefront;

providing a wavefront phase imager for generating images using an array of pixels with each of said pixels defined by a size dimension;

acquiring a plurality of phase images of the optical wavefront using the phase imager wherein each of said phase images is unique and shifted with respect to another of said phase images by a known amount that is less than the pixels' size dimension;

combining said plurality of phase images to generate a single high-spatial frequency phase image of the optical wavefront, wherein said step of combining includes the step of stitching overlapping portions of said plurality of phase images in the spatial domain; and deconvolving each of said overlapping portions using the pixels' size dimension and the phase imager's point spreading function.

27. A wavefront phase imaging method, comprising the steps of:

providing an optical system capable of producing an optical wavefront;

providing a wavefront phase imager for generating images using an array of pixels with each of said pixels defined by a size dimension;

acquiring a plurality of phase images of the optical wavefront using the phase imager, wherein at least one of the optical system and the phase imager is moved by a controlled amount after each of said phase images is acquired such that each of said phase images is unique and shifted with respect to another of said phase images, and wherein said controlled amount is less than the pixels' size dimension;

spatially filtering each of said plurality of phase images to form a corresponding plurality of filtered phase images;

combining said plurality of filtered phase images to generate a single phase image of the optical wavefront, wherein said step of combining includes the step of stitching overlapping portions of said plurality of filtered phase images in the spatial domain; and deconvolving each of said overlapping portions using the pixels' size dimension and the phase imager's point spreading function.

* * * * *